United States Patent [19]
Nott

[11] 3,753,350
[45] Aug. 21, 1973

[54] REVERSIBLE HYDRAULIC ACTUATOR WITH SELECTABLE FAIL-SAFE OPERATION

[75] Inventor: Peter T. M. Nott, Bath, England

[73] Assignee: Rotork Limited, Lower Weston, Bath, Somerset, England

[22] Filed: Aug. 30, 1971

[21] Appl. No.: 175,864

[52] U.S. Cl............ 60/403, 60/404, 60/406, 60/478, 91/361
[51] Int. Cl............................... F15b 13/044
[58] Field of Search............... 60/52 US, 52 CD, 60/DIG. 2, 403, 404, 406, 478; 91/361

[56] References Cited
UNITED STATES PATENTS

| | | | |
|---|---|---|---|
| 3,435,614 | 4/1969 | Ledeen et al. | 60/52 CD |
| 3,050,257 | 8/1962 | Sweger et al. | 60/52 US |
| 3,570,243 | 3/1971 | Comer et al. | 60/DIG. 2 |

*Primary Examiner*—Edgar W. Geoghegan
*Attorney*—Stevens, Davis, Miller & Mosher

[57] ABSTRACT

The invention is concerned with a modulating actuator in which a linearly movable output shaft is movable in one direction by a single acting hydraulic motor and in the other direction by the stored energy of a spring device. The hydraulic circuit for the motor includes two solenoid operated control valves, the operation of which is reversible by a manual control so as to select a desired mode of fail-safe operation in the event of power failure. The actuator can be selected to fail-safe in an end position of the output shaft or to stay put in its actual position of movement.

11 Claims, 7 Drawing Figures

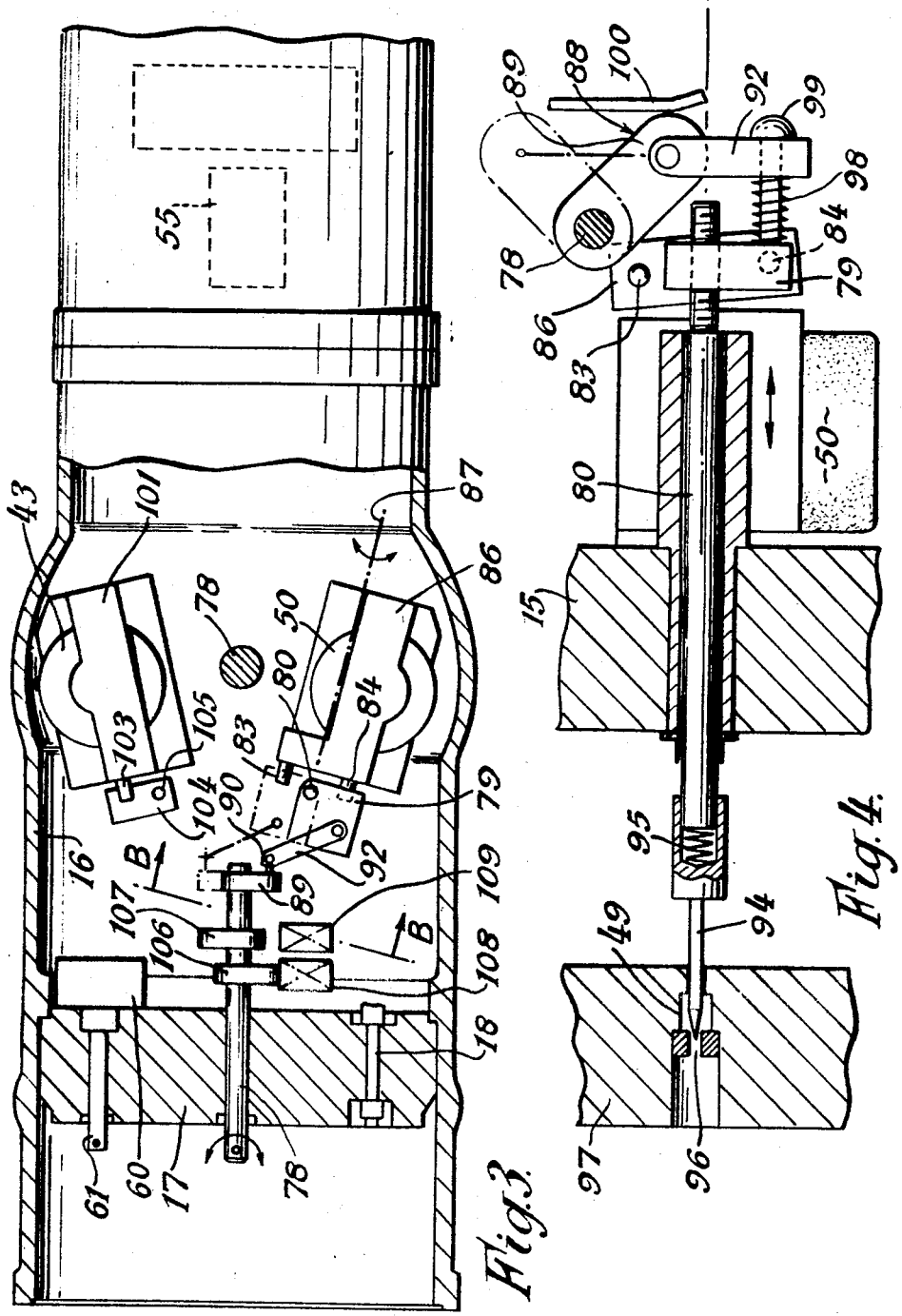

REVERSIBLE HYDRAULIC ACTUATOR WITH SELECTABLE FAIL-SAFE OPERATION

This invention relates to actuators and in particular to modulating actuators which are operable to position an output member at any desired position between its end or limit positions of movement in accordance with an input or control signal received from a remote point.

Such modulating actuators are typically used in industrial and other applications for the positional control of valves and other equipment, such as dampers, ventilators, metering pumps, variable resistances and variable transformers. Hitherto, the actuators have usually been pneumatically operated in conjunction with pneumatic instrumentation and control systems. However, with the growing tendency to use electronic instrumentation including computers for plant control it has become necessary to convert the electric control signals to pneumatic signals for subsequently operating the penumatic modulating actuators. Presently used installations must therefore include a transducer and this additional equipment together with the normal compressed air installation has now made the use of penumatic actuators a more costly proposition.

An object, therefore, of the present invention is the provision of a more simple actuator which is less costly to instal and which is operable as a modulating actuator.

The invention is also particularly concerned with the problem of fail-safe operation in the event of power failure in the actuator.

In the design of process plants, refineries, pipelines, etc., it is normally important, if not essential, to ensure that dangerous conditions do not arise in the event of failure of the power supply to the actuator. This problem particularly affects control valves which, depending on the process and the fluid being controlled, may be required to open, shut or remain in the same position in the event of power failure. In addition, it may not be possible to decide the mode of fail-safe operation until the plant is commissioned.

It is, therefore, a further object of the invention to provide an actuator which includes means for on-site choice of open, shut or stay-put fail-safe operation in the event of power failure.

The above objects are broadly obtained by providing an actuator which comprises a linearly movable output member, power means operable to move said output member in a first direction of movement, resilient means for moving said output member in a second opposite direction of movement, control means for energising said power means and selector means for selectively adjusting said control means, said selector means being movable to a first position in which failure or de-energisation of said control means results in movement of said output member to an end position of its stroke in response to the stored energy of said resilient means, or to a second position in which the output member stays put and is held in its position of movement upon failure or de-energisation of said control means.

The preferred embodiment of the invention is basically electro-hydraulically operated, the power means comprising a single acting hydraulic motor having a piston connected with said output member, the piston being urged in one direction by hydraulic pressure fluid supplied by a pump driven by a continuously running electric motor and in the opposite direction by the resilient means which conveniently comprises a spring providing a return action for the piston.

The movement of the output member in one direction is obtained by the closure of a solenoid operated valve whereby hydraulic fluid is pumped from the reservoir through a non-return valve into the cylinder of the hydraulic unit, and in the other direction by the return spring after the hydraulic fluid pressure has been released from the cylinder through a second solenoid operated pressure relief valve.

The operation of the second solenoid operated valve therefore determines, in the event of power failure, whether the output member will move or remain in the same position. The present invention proides a manually operable device which can be selectively operated on-site to select a predetermined movement of the second solenoid operated valve in the event of power failure. The selection of the direction of movement of the output member in the event of power failure is preferably determined by the method of mounting of the actuator initially in relation to the valve or other equipment to be controlled.

An electrical control circuit is provided for the operation of the actuator and this circuit preferably includes a position feedback potentiometer which provides a singal voltage proportional to the position of the output member. The feedback signal is compared with the input control signal which may be received from a remote point and if there is a difference the resulting or differential signal energises the solenoid operated valves through power relays until the output member is moved to a position which corresponds to the input control signal.

To provide for ready inversion of the actuator the hydraulic unit and reservoir are located in a sealed casing and the reservoir preferably includes compensating means such as an inflatable bladder to allow for possible expansion and/or contraction of the hydraulic fluid.

In order that the invention may be clearly understood the preferred embodiment will now be described in detail with reference to the accompanying drawings, in which:

FIG. 3 is a section on the line A—A of FIG. 2 showing in particular details of the fail-safe selector mechanism;

FIG. 4 is a section on the line B—B of FIG. 3 wich has been drawn to a greatly enlarged scale so as to show further details of the fail-safe selector mechanism;

Figure 1:
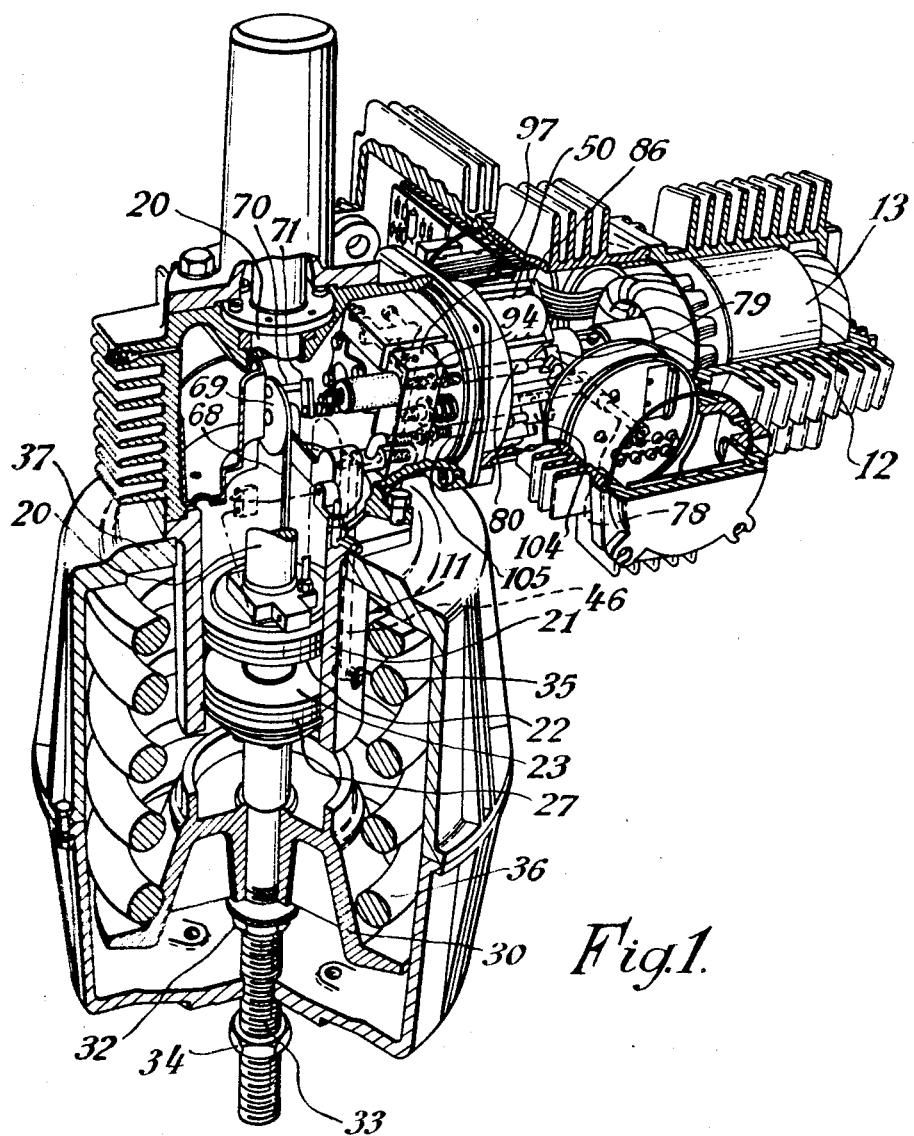
FIG. 1 is a perspective view of the complete actuator with parts of the casings cut away or removed so as to show details of the actuator mechanism.

The actuator as shown in FIGS. 1 to 4 of the drawings is basically electro-hydraulically operated and the mechanism is contained in a casing which comprises a main housing 10 which for convenience is shown in the drawings as being positioned vertically, but as will be hereinafter explained can be located in any desired position. The housing 10 contains a hydraulic servo-unit or motor 11 and the housing is connected at its upper end to a transverse housing 12 which contains a continuously driven electric induction motor of any suitable type which is drivably connected with a pump 14 through a partition 15 in the housing 12.

Figure 2:
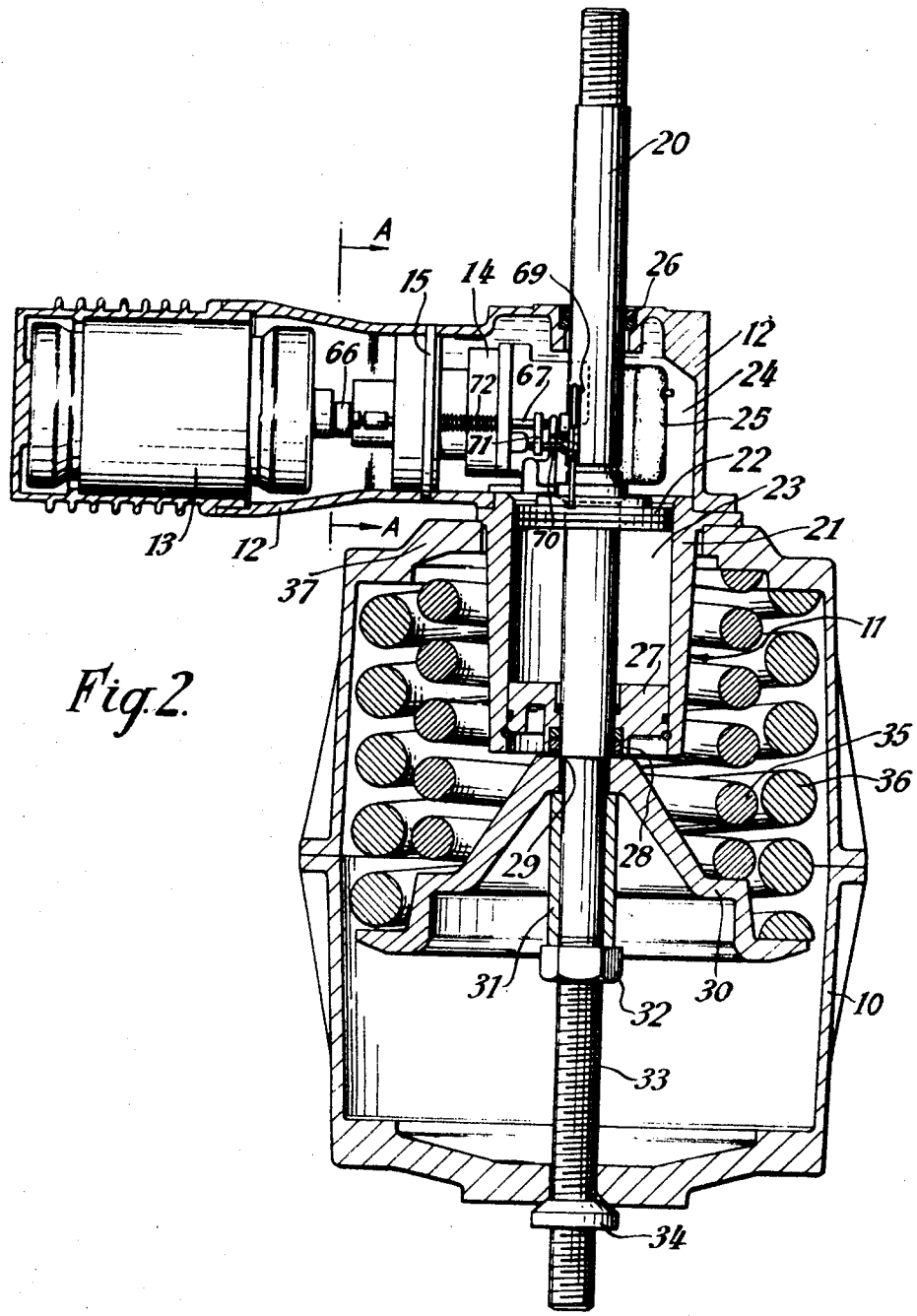
FIG. 2 is a side elevation in section of the actuator as shown in FIG. 1.

A further housing 16 extends transversely of the housing 12 as shown by the section in FIG. 3 taken on the line A—A of FIG. 2. The housing 16 contains the electrical control units including switches, power relays and transformers and also includes a flameproof or weatherproof barrier 17 thrugoh which the control members for the actuator extend. As shown in FIG. 3 the usual terminal stems 18 are provided for the electrical supply leads and other manually operable members are provided as will be hereinafter described for adjusting and setting up the actuator on-site.

An output member in the form of a shaft 20 extends through the main housing 10 and its upper end extends also through the hydraulic motor 11 into the housing 12. The shaft 20 extends through the lower end of the main housing 10 and also through the upper part of the housing 12. The hydraulic motor 11 includes a cylinder 21 which is connected with that part of the housing 12 containing the pump 14. A piston 22 is rigidly connected to the shaft 20 and is movable within the cylinder 21 under the action of hydraulic fluid pressure supplied to the chamber 23. The low pressure side of piston 22 is in direct communication with the housing 12 containing the pump 14 and which comprises a hydraulic fluid reservoir 24 for the supply and return of hydraulic fluid pressure to and from the chamber 23.

The reservoir 24 and hydraulic motor 11 thereby form a sealed unit which enables the actuator to be located in any desired position. To compensate for any possible expansion and/or contraction of the hydraulic fluid a gas filled bladder 25 is provided in the reservoir. If desired the bladder may be replaced by an elastic wall for the reservoir, a flexible gas filled bellows or a volume of closed cell elastic foam material.

The two ends of the shaft 20 are provided for connection to any suitable member to be controlled such as a valve. The shaft may be connected at either end dependent on the direction of control and as will be explained the actuator may be positioned as shown in FIG. 2 or inverted dependent upon the direction of operation for fail-safe control.

The upper end 20 of the shaft extends through the housing 12 in sealing-tight manner by the provision of suitable sealing rings 26. The lower end of the shaft extends through the head 27 of the cylinder 11 also in sealing-tight manner by means of sealing rings 28 and the shaft is provided with a shoulder 29 for engagement by an annular cup-shaped member 30 which is held in position against the shoulder 29 by a sleeve 31 secured by a nut 32 on the threaded portion 33 of the shaft 20. The shaft may also be provided with an adjustable collar 34 for engaging the base of the housing 10 so as to determine the upward movement of the shaft in response to supply of hydraulic pressure fluid to the chamber 23.

The hydraulic motor 11 is single acting and the upward movement of the piston 22 in the cylinder 21 is adapted to compress a pair of compression springs 35, 36 which seat at one end on the cup-shaped member 30 and at the other end on the upper wall 37 of the housing 10. The arrangement is such that the stored energy of the springs 35, 36 when compressed will act to move the output shaft 20 downwardly when the hydraulic fluid pressure is released from the chamber 23.

In the event, therefore, of a failure of the control unit supplying the hydraulic fluid to the chamber 23 the stored energy of the springs 35, 36 will automatically return the output member 20 to its lowermost position as shown in FIG. 2 which determines one mode of fail-safe operation for the actuator. In the event that an opposite movement of the control member is required on failiure of the actuator control it will be appreciated that the control member should be connected to the other end of the shaft 20 or, as previously explained, the actuator on connection can be set up in the inverted position.

As will be further explained the actuator includes a manual selector which permits a stay-put operation upon failure of the actuator control and this is broadly obtained by the automatic isolation of the chamber 23 in the event of control or power failure.

Figure 6:
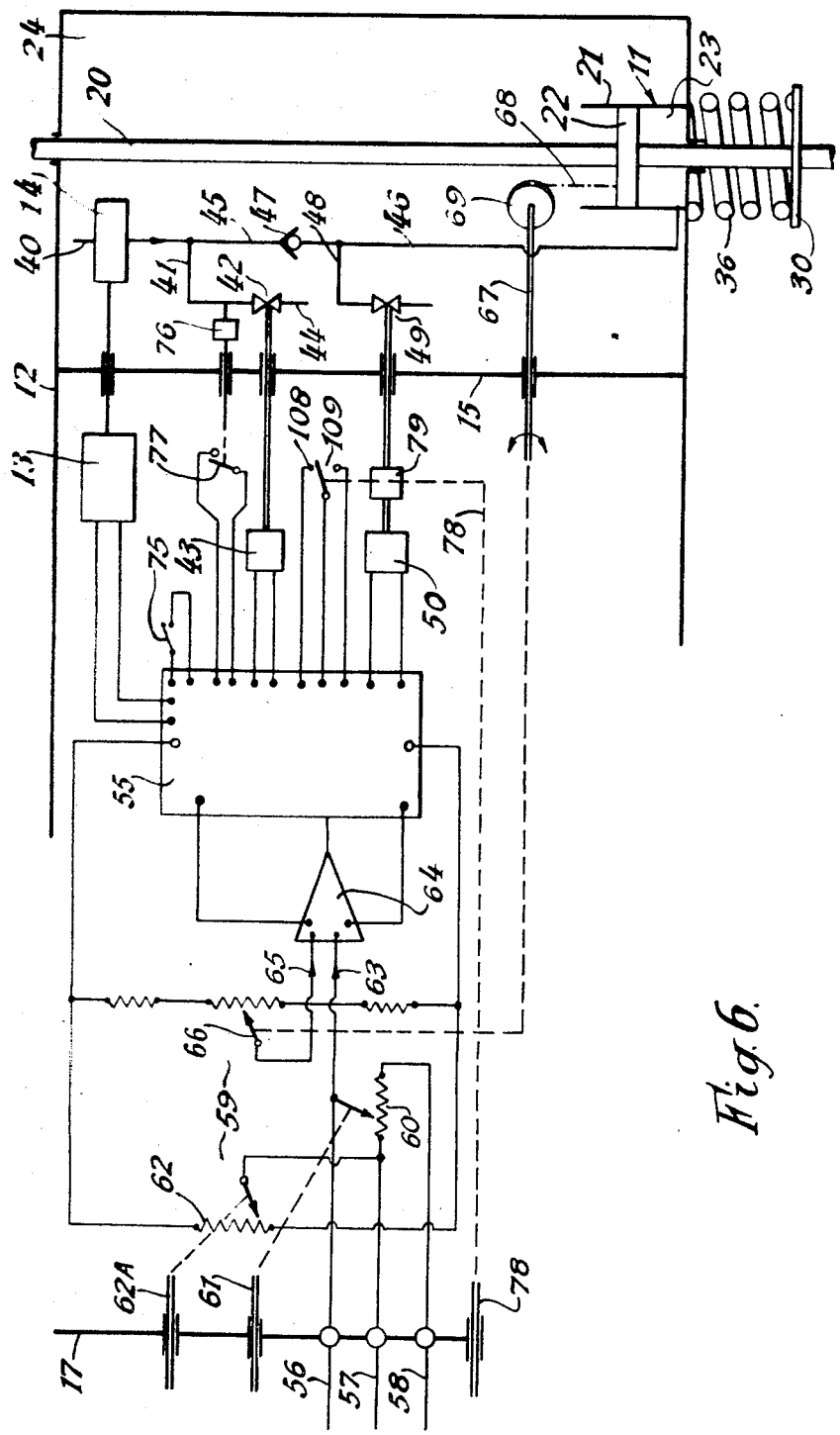
FIG. 6 is a diagrammatic illustration of a suitable control cirucit layout together with details of the hydraulic circuit.

Referring now to FIG. 6 of the drawings a suitable electric control circuit is shown diagrammatically together with the hydraulic circuit for the motor 11.

As previously mentioned, the motor 13 is continuously running through operation of the actuator and the motor drives the pump 14 located in the reservoir 24. The pump 14 circulates hydraulic fluid from its inlet 40 through a piepline 41 to a control valve 42 which is operated by a solenoid 43. The normal operation of the solenoid 43 is to maintain the valve 42 open so that the hydraulic fluid is returned by the pipeline 44 to the reservoir 24. The pump 14 is also connected to a pipeline 45 which is connected with a pipeline 46 through a non-return valve 47. The pipeline 46 is connected to the chamber 23 of the motor 11 and this pipeline also has a connection with the reservoir 24 through a pipeline 48 containing a second control valve 49 controlled by a solenoid 50. Under normal operation the valve 49 is closed thus retaining fluid pressure in the chamber 23 and the associated pipeline 46 which results in the piston 22 being maintained in a desired position as selected by the electric control unit as will be hereinafter described.

As previously mentioned, the valve 42 is normally held in its open position while the valve 49 is held closed. Assuming the piston 22 is in an intermediate position in the cylinder 21 movement of the piston 22 in the upward direction can be obtained by closing of the valve 42 by the actuator control. Closing of the valve 42 results in the supply of hydraulic pressure fluid through the non-return valve to the chamber 23 and this will continue until the desired position is reached at which time the valve 42 is opened.

Movement of the piston 22 in the reverse direction is obtained by opening of the valve 49 which results in the release of hydraulic pressure fluid from the chamber 23 to return to the reservoir 24 so that the return springs 35, 36 can move the piston 22 downwardly until the valve 49 is again closed by the actuator control.

In normal operation the solenoid 50 is energised to hold the valve 49 closed and it will be appreciated that in the event of failure of the electrical control circuit the solenoid 50 will be de-energised thus automatically opening the valve 49. This will result in a fail-safe movement of the piston 22 and thereby the shaft 20 in a downward direction as shown in FIGS. 2 and 6 under the action of the stored energy of the springs 35, 36.

The actuator provides a manual selector which enables the operation of the solenoid 50 to be reversed, if desired, so that the valve 49 will be held closed when the solenoid is de-energised. This enables a fail-safe position to be obtained upon power failure which results in the output shaft being held in its position of movement at the time of power failure.

Referring to FIG. 6 the electronic control unit located in the housing 12 includes an electric control unit 55 from which the motor 13 and the solenoids 43 and 50 are energised in accordance with input signals. The circuit shown is adapted to receive an input signal from a remote point which may be a small DC current signal, for example 4 to 20 mA, which is applied to the input lines 56, 57 extending through the barrier 17 in the housing 12. In the event of a voltage signal being used this will be applied on the supply lines 56, 58. The input signal is applied to a bridge circuit 59 which includes potentiometer 60 which is adjustable by the control member 61 externally of the barrier 17 for changing the signal range and thereby the adjustment of the travel of the actuator. A similar potentiometer 62 is provided for the zero adjustment of the actuator also externally of the barrier 17 by a control member 62A as shown in the circuit diagram of FIG. 6. The input signal is fed by the line 63 to a differential amplifier 64 where the signal is compared with a feedback signal supplied to the differential amplifier 64 by a line 65 from the potentiometer 66. The feedback potentiometer 66 is mechanically adjusted by a shaft 67 which is rotated in accordance with the movement of the piston 22 in the motor 11. As shown in FIG. 1 of the drawings the piston 22 is connected by a chain 68 with a pulley 69. The pulley has an eccentric pin 70 which engages a projecting member 71 on shaft 67. The member 71 is held against the eccentric pin 70 by means of the action of spring 72 which ensures that the shaft 67 follows the movement of the piston 22 as provided by rotation of the pulley 69.

The error circuit of the electronic control circuit therefore comprises the adjustable zero-set potentiometer 62 and the position feedback potentiometer 66 which are connected in parallel across the stabilised DC supply. The potentiometer outputs are connected to the differential amplifier 64 and the connection of the zero-set potentiometer 62 includes the variable potentiometer 60 which is connected across the input signal lines 56, 57 from a remote point.

The action of the electronic control unit 55 in response to the differential signal from the amplifier 66 is to move the piston 22 and therefore the output shaft 20 until the voltage supply to the differential amplifier 64 from the position feedback potentiometer 66 is equal to the sum of the voltage from the zero-set potentiometer 62 and the input signal voltage. The movement of the output shaft 20 is therefore proportional to the input signal from the remote point on the lines 56, 57 or 56, 58.

The full stroke of the output shaft 20 is therefore equivalent to the difference of voltages generated across the variable potentiometer 60 by the maximum and minimum currents of a signal range in use. The variable potentiometer 60 can therefore be adjusted by the member 61 to give the required voltage range and therefore the required stroke from any of the normal signal ranges. As the potentiometer spindles are brought out through the barrier 17 all these adjustments can be made when commissioned on-site without disturbing the sealed enclosure containing the control unit 55 and its relays.

As shown in FIG. 6 the electronic control circuit is completed firstly by a thermostatic switch 75 which may be provided in or adjacent the motor windings so as to de-energise the motor or open the valve 49 if the motor gets too hot. The electronic control unit 55 may also include adjustable switches to limit the movement of the output shaft 20 in either or both directions.

The hydraulic fluid pressure line 41 may also be provided with a pressure responsive unit 76 connected through the reservoir wall with a switch 77 for actuating the control unit to open the valve 42 in the event of excessive pressure on the output side of the pump 14.

Figure 5:
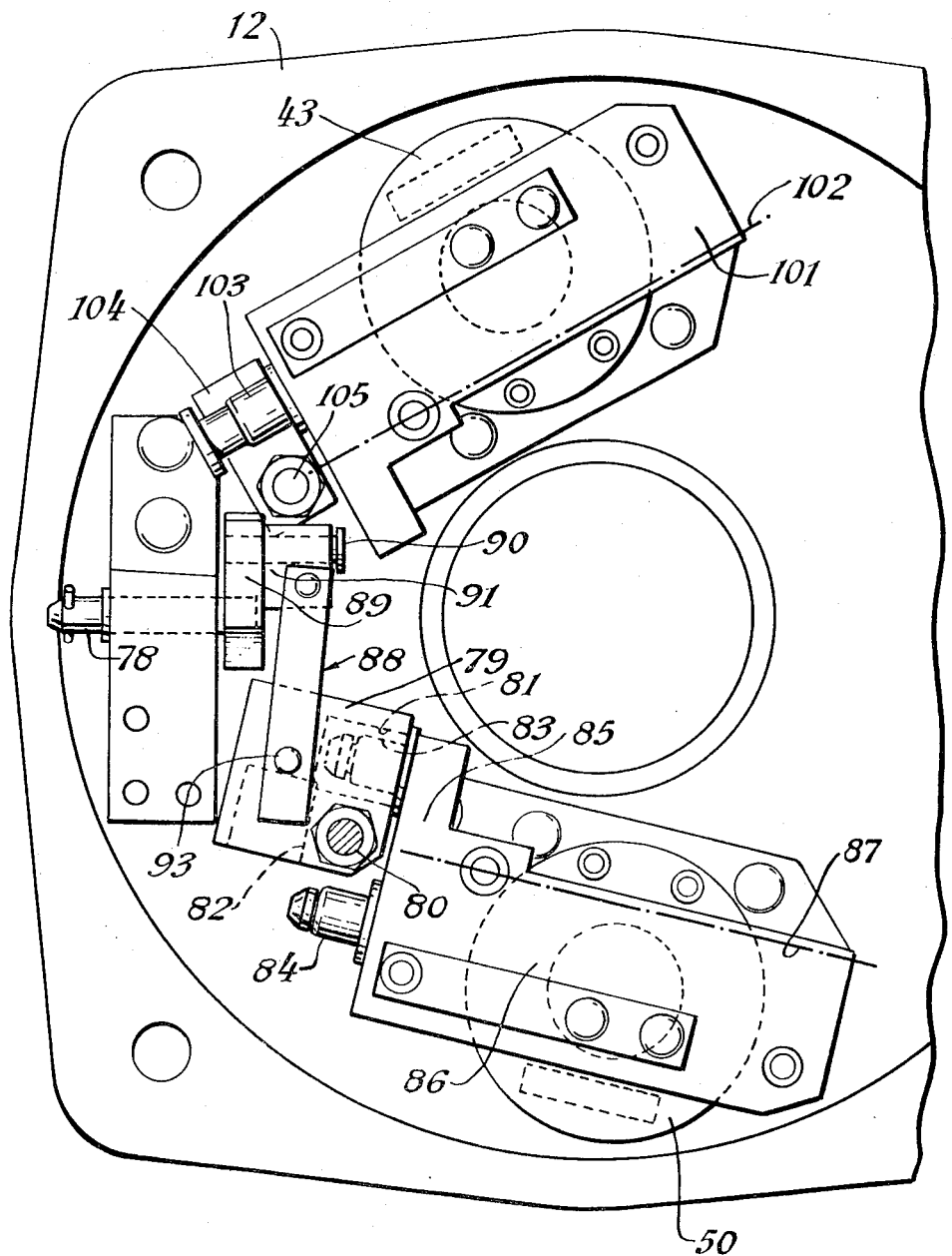
FIG. 5 is an enlarged side view of the selector mechanism for changing the operation of the second control valve.

The manual selector mechanism for reversing the operation of the solenoid controlled valve 49 will now be described. The selector comprises a shaft 78 which extends through and is rotatable from the outside of the barrier 17 of the housing 16. At its inner end the shaft 78 is connected with a block 79 to which the valve operating stem 80 is connected. The block 79 is formed with two apertures 81, 82 therein on adjacent faces at right angles to each other. The apertures 81, 82 are adapted respectively to engage over pins 83, 84 projecting from the sides of an extension 85 of an L-shaped armature 86 associated with the solenoid 50. Energisation of the solenoid 50 pivots the armature 86 about the line 87 which is located on the axis of the valve operating stem 80. The block 79 is pivoted by rotation of the shaft 78 about the axis of the valve operating stem 80 from a first position as shown in FIG. 5 to a second position shown in FIG. 3. In the first position the aperture 81 in the block 79 engages the pin 83 at one side of the povital axis of the armature 87 while in the second position the aperture 82 engages the pin 84 on the other side of the pivotal axis 87 of the armature. The pivotal axis 87 is determined by the abutment of the armature on the casing of the solenoid 50 as shown in FIG. 4 of the drawings.

The pivotal movement of the block 79 about the axis of the valve operating stem 80 is obtained by a mechanical linkage 88 connected with the manually operable selector shaft 78. The arrangement is shown diagrammatically in FIGS. 3 and 4 and in greater detail in the enlarged view in FIG. 5. The shaft 78 carries a lever 89 which is attached by a pin 90 to a block 91 which is thereby angularly movable in response to rotation of the shaft 78. A lever 92 is loosely pinned at one end to the block 91 and is connected at its other end by a pin 93 to the block 79. The limited rotational movement of the shaft 78 is thereby translated into a linear movement of the lever 92 so as to pivot the block 79 through 90° about the axis of the valve operating stem 80.

Referring now to FIG. 4 of the drawings it will be seen that the valve operating stem 80 is connected to the valve member 94 through a light spring 95, the parts being connected so that relative movement between the stem 80 and valve member 94 is limited. The valve member 94 is movable in relation to the valve seat 96 in the hydraulic control block 97 (see also FIG. 1). In the event of actuation of the shaft 78 to reverse the operation of the solenoid 50 so as to obtain a fail-safe position in which the actuator stays put, the deenergisation of the solenoid 50 under such conditions will result in the valve 94 tending to move away from its closed position under the hydraulic pressure in chamber 23. In order to ensure positive closure of valve member 94 on valve seat 96 a supplementary closure force is provided by means of a spring 98 which is located on the pin 93 between the lever 92 and the block 79. As shown in FIG. 4 as the linkage 88 moves to its "reverse operation" position as shown in chain lines the head of a projection 99 on lever 92 engages a ramp 100 which moves the lever 92 inwardly to compress spring 98 thus ensuring a positive closure of the valve when the solenoid is de-energised.

The solenoid 43 is shown in greater detail in FIG. 5 and it will be seen that the solenoid is also provided with an L-shaped armature plate 101 pivotable about axis 102, the armature plate carrying a projecting pin 103 which engages a block 104 to which the stem 105 of the valve 42 is rigidly connected. The valve structure is similar to that of the valve 49 as shown in FIG. 4 of the drawings.

In the event of operation of shaft 78 to reverse the operation of solenoid 50 it will be understood that the electrical supply circuits to the solenoids 43 and 50 will also have to be reversed so as to maintain proper operation of the actuator under operating conditions. In order to effect this reversal of the electrical supply circuits to the solenoids an arrangement is shown diagrammatically in FIGS. 3 and 6 of the drawings. As shown the arrangement comprises a pair of cams 106 and 107 which are mounted on the shaft 78 for rotation therewith and which are engageable with switch operating members 108 and 109 respectively. Rotation of the shaft 78 actuates the switches 108, 109 to reverse the supply circuits from the control unit 55 and it will be appreciated that this is effected automatically upon operation of shaft 78.

Figure 7:
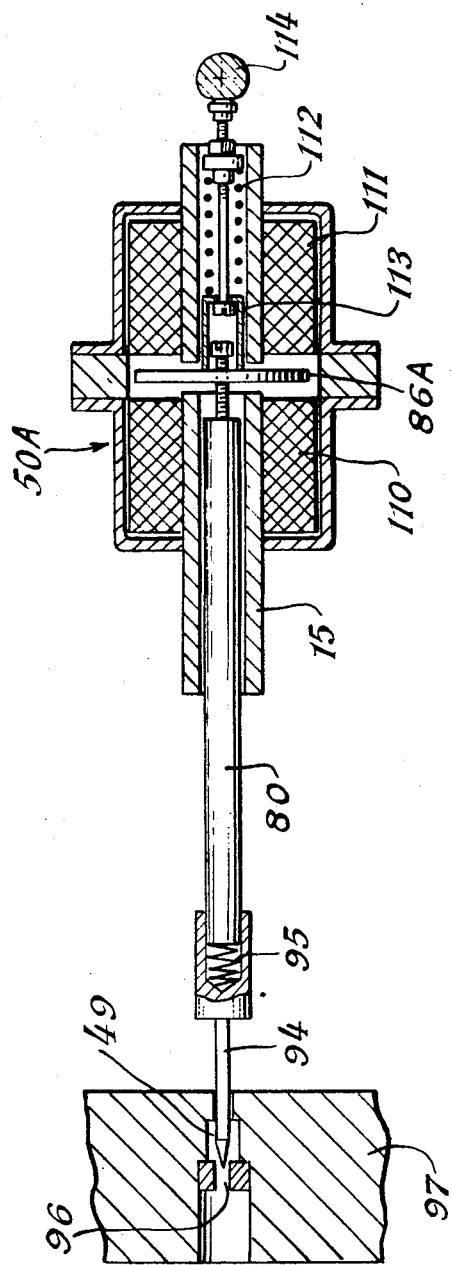
FIG. 7 is a sectional elevation similar to FIG. 4 but showing a modified mechanism for reversing the operation of the control valve which determines the fail-safe operation of the actuator.

A modified arrangement for reversing the operation of the solenoid 50 is shown diagrammatically in FIG. 7 of the drawings. This drawing corresponds to FIG. 4 but in this embodiment the solenoid 50 is replaced by a solenoid 50A which comprises two independently operable solenoids 110 and 111. Under normal operating conditions the solenoid 110 is energised so as to attract the common armature plate 86A to effect positive closure of the valve 49. In the event of deenergisation of solenoid 110 the valve 49 will open so as to provide a fail-safe position which is an end position of the actuator stroke.

If reverse operation is required actuation of shaft 78 is adapted to change over the supply circuits to the second solenoid 111 so that energisation of solenoid 111 will result in movement of the common armature plate 86A to the right as shown in FIG. 7 thus opening the valve 49. De-energisation of the solenoid results in movement of the valve member 94 to its closed position and as before, to ensure positive closure of the valve under such conditions, a supplementary spring 112 is provided which acts on the armature plate 86A through a cup-shaped member 113. The spring 112 is compressed to render it effective by means of a rotatable cam member 114 coupled or otherwise connected with the manually operable selector shaft 78.

It will be appreciated that the invention provides a modulating actuator construction which is operable to position the output shaft at any desired position in accordance with the input or control signal. A simple mechanism is provided for on-site operation to select a desired fail-safe position. The hydraulic arrangements are completely sealed to enable reversal of the position of the actuator if required. The provision of a continuously running electric motor and pump unit eliminates inertia and overrun problems which are normally associated with stop-start systems.

I claim:

1. An actuator comprising a linearly movable output member, power means operable to move said output member in a first direction of movement, resilient means for moving said output member in a second opposite direction of movement, control means for energising said power means and selector means for selectively adjusting said control means, said selector means being movable to a first position in which failure or de-energisation of said control means results in movement of said output member to an end position of its stroke in response to the stored energy of said resilient means, or to a second position in which the output member stays put and is held in its position of movement upon fialure or de-energisation of said control means.

2. An actuator according to claim 1, wherein the power means comprises a single acting hydraulic motor having a piston connected with said output member, said piston being urged in one direction by a hydraulic pressure fliud and in the opposite direction by the stored energy of said resilient means.

3. An actuator as claimed in claim 2, wherein the hydraulic motor is connected in a hydraulic circuit which includes a pump driven by a continuously running electric motor, a first control valve operable for controlling the supply of hydraulic pressure to said hydraulic motor, and a second control valve for controlling the return flow of said hydraulic fluid from said hydraulic motor.

4. An actuator as claimed in claim 3, wherein the valves are both controlled by electrically operable solenoids, said solenoids and said electric motor being operable by said control means which comprises a manually operable electric circuit.

5. An actuator as claimed in claim 4, wherein the selector means is manually operable to reverse the direction of operation of said second control valve in response to energisation of its solenoid by the electric control circuit whereby said second control valve is selectively held shut or open upon de-energisation of said solenoid upon failure of said electric control circuit.

6. An actuator as claimed in claim 5, wherein said selector means is operable simultaneously to reverse the electrical supply circuits to both said solenoids upon reversal of said second control valve operation.

7. An actuator as claimed in claim 5, wherein the hydraulic circuit includes a sealed reservoir and hydraulic motor unit so as to permit inversion of said actuator, and said reservoir includes compensating means such as an inflatable bladder to allow for possible expansion and/or contraction of the hydraulic fluid therein.

8. An actuator as claimed in claim 5, wherein the selector means includes a shaft extending through a flameproof and/or weatherproof barrier into the actuator casing, and said shaft includes a mechanical linkage for selectively connecting said second control valve to the armature of said solenoid at one or other side of its pivotal axis.

9. An actuator as claimed in claim 8, wherein the mechanical linkage is operable to move the pivotal block connected with said second control valve into engagement with one or other of a pair of spaced pins on said armature.

10. An actuator as claimed in claim 5, wherein the selector means is operable to connect one or other of a pair of opposed solenoids into the electrical control circuit for controlling the movement of a common armature connected with the second control valve.

11. An actuator as claimed in claim 5, wherein the piston of said hydraulic motor includes feedback means operating a potentiometer for producing an electric feedback signal proportional to the position of said piston, said feedback signal being compared with an electric input signal for producing a differential operating signal for said electric control circuit.

* * * * *

UNITED STATES PATENT OFFICE
CERTIFICATE OF CORRECTION

Patent No. 3,753,350                    Dated August 21, 1973

Inventor(s) PETER T. M. NOTT

It is certified that error appears in the above-identified patent and that said Letters Patent are hereby corrected as shown below:

On the title page at Item 30, it should read:

Claims priority, applications Great Britain, September 4, 1970, 42352/70; April 19, 1971, 9758/71.

Signed and sealed this 17th day of September 1974.

(SEAL)
Attest:

McCOY M. GIBSON JR.
Attesting Officer

C. MARSHALL DANN
Commissioner of Patents